United States Patent [19]
Hieda

[11] Patent Number: 4,963,982
[45] Date of Patent: Oct. 16, 1990

[54] IMAGE PICKUP APPARATUS WITH EXCESS-CHARGE CONTROL

[75] Inventor: Teruo Hieda, Yokohama, Japan

[73] Assignee: Canon Kabushiki Kaisha, Tokyo, Japan

[21] Appl. No.: 418,737

[22] Filed: Oct. 3, 1989

Related U.S. Application Data

[60] Continuation of Ser. No. 165,098, Mar. 7, 1988, abandoned, which is a division of Ser. No. 809,915, Dec. 17, 1985, Pat. No. 4,748,506.

[30] Foreign Application Priority Data

Dec. 28, 1984 [JP] Japan .................. 59-276972
Dec. 28, 1984 [JP] Japan .................. 59-276973
Dec. 28, 1984 [JP] Japan .................. 59-276974

[51] Int. Cl.$^5$ ............................................. H04N 3/14
[52] U.S. Cl. ............................ 358/213.18; 358/213.19
[58] Field of Search ............... 358/909, 228, 213.15, 358/213.19, 213.26, 213.18, 213.13

[56] References Cited

U.S. PATENT DOCUMENTS 4,599,654 7/1986 Monroe ..................... 358/213.13
4,763,196 8/1988 Sakai ........................ 358/213.19

*Primary Examiner*—Stephen Brinich
*Attorney, Agent, or Firm*—Fitzpatrick, Cella, Harper & Scinto

[57] ABSTRACT

An image pickup apparatus in which a flux of light which enters through an iris to form an optical image is received by an image pickup element, the accumulating time of this image pickup element is changed, thereby converting the optical image which is obtained for a desired period of time into an electrical signal. In this apparatus, for example, the gain of the iris or signal processing system of the electrical signal is changed to control the electrical signal to a predetermined level irrespective of the noise component which is generated when the accumulating time is changed to eliminate adverse effects of undrained excess charge in the pickup unit.

20 Claims, 7 Drawing Sheets

IMAGE PICKUP APPARATUS WITH EXCESS-CHARGE CONTROL

This application is a continuation of application Ser. No. 07/165,098 filed Mar. 7, 1988, now abandoned, which is a division of application Ser. No. 809,915 filed Dec. 17, 1985, now U.S. Pat. No. 4,748,506.

BACKGROUND OF THE INVENTION

Field of the Invention

The present invention related to an image pickup apparatus using a solid state image pickup for example, a CCD (charge couple device), in e.g., a television camera it has conventionally been proposed that the accumulating time of the image pickup device can be reduced than to less the field (or frame) period of a television signal by changing the method of driving the solid state image pickup device.

For instance, in the U.S. patent application Ser. No. 596,404 filed on Apr. 3, 1984, there has been proposed by the assignee of this application the driving method whereby, for example, in solid state image pickup devices of the frame transfer type, the charges in the photosensing unit to perform the photoelectric conversion and the accumulation of the charges are drained by once vertically transferring them within the vertical interval and the remaining interval of the vertical interval is further used as the substantial accumulating time.

According to this method in the television camera of, e.g., the NTSC system although the accumulating time is ordinarily 1/60 second, this time can be set to 1/500 second, or the like; therefore, there are effects such that the iris need not be reduced even in the case of a large amount of incident light, an image of an object moving at a high speed is not moved and the like. However, while the foregoing operation is being performed, in particular, if the substantial accumulating time is reduced when the charges which are accumulated for the period of time within the vertical interval are drained without taking them out as a signal as mentioned above, the amount of charges to be drained will have considerably increased. For example, when the substantial accumulating time $T_2$ of the charges to be drained to the to the time $t_1$ becomes $$t_2/t_1 = (1/60 - 1/500) \; 1/500 \div 7.3$$

Namely, the ratio becomes about 7.3 Assuming that the level of charges which are accumulated for a period of time $t_1$ is the normal level, charges which are 7.3 times larger than the normal level are accumulated for the time $t_2$. In the case where such a large number of charges are accumulated in this manner, it is very difficult to drain all of these charges and prevent their having an influence on the substantial accumulating time. Particularly, a great quantity of charges are generated in what is called a highlight portion or the like on the display screen and when the vertical transfer is performed within the vertical interval to drain the charges a large amount of charges remain, so that an image which is displayed on the screen is adversely influenced.

In the output of the image pickup device, the amount of those residual charges becomes four to ten times (nearly the level of the saturation signal of the image pickup device) as large as the signal level. Thus, such a high signal level causes abnormal response of the signal processor and malfunction of the gain control or iris control.

In addition, an image pickup apparatus in which the charges in both the photosensing unit and the storage unit are drained within the vertical interval has also been proposed. According to this apparatus, no output signal is obtained for interval before the transfer within the vertical interval, so that the iris control, gain control and the like become inaccurate.

SUMMARY OF THE INVENTION

It is an object of the present invention to solve the above-mentioned conventional drawbacks.

A second object of the invention is to provide an image pickup apparatus in which is the iris control and gain control operations are properly performed even the case where the substantial accumulating time is reduced to the draining of a signal from an attached photoelectric converting device within the photoelectric converting and charge accumulating intervals.

Another object of the invention is to provide an image pickup apparatus which performs the iris control and gain control operations in response to an output of a photoelectric converting device, wherein even in the case where an unnecessary noise component is time-sequentially generated in the output of the photoelectric converting device, the image pickup apparatus is not influenced by this noise component.

Still another object of the invention is to provide an image pickup apparatus in which the iris control and gain control operations, of the image pickup apparatus, in particular, are properly carried out irrespective of the noise component mentioned above.

According to the present invention, these objects are attained by provision of an image pickup apparatus having an image pickup device which converts an image into an electrical signal and also outputs an "obstacle" or unusable signal, i.e., a signal whose presence it is desired to eliminate. A control device is provided in conjunction with the image pickup device, to control the apparatus responsive to the electrical signal, in such a manner that the pickup apparatus generates a proper signal representing the image. A device is also provided adjusting the control such that the latter is not influenced by the obstacle signal output by the image pickup device. The control device may, for example, include an iris for limiting the amount of image which enters the pickup device. The control may, for example, include an amplifier for amplifying the electrical signal outputed from the image pickup device and a control circuit for controlling the amplifier gain. According to one preferred embodiment, the pickup device may include an image sensing portion for producing the electrical image signal and the readout portion for reading out that signal, and a drive means may be provided for driving the pickup device. In this embodiment the drive means has a first mode for reading the image signal out from the pickup device and a second mode for clearing the signal from the sensing portion of the pickup device during readout of the signal. First and second control mans are also provided in this embodiment, the first being responsive to the image signal and being structured and arranged for effecting control of a signal level of the image signal, and the second being responsive to a noise component t due to the pickup means when the latter is driven in the second mode and being structured and arranged to respond to the noise component to the effect control of the first control means.

The above and other objects and features of the present invention will be more fully appreciated from the following description with reference to the accompanying drawings.

DESCRIPTION OF THE PREFERRED EMBODIMENTS

The preferred embodiments of the present invention will now be described in detail hereinbelow with reference to the drawings.

Figure 1:
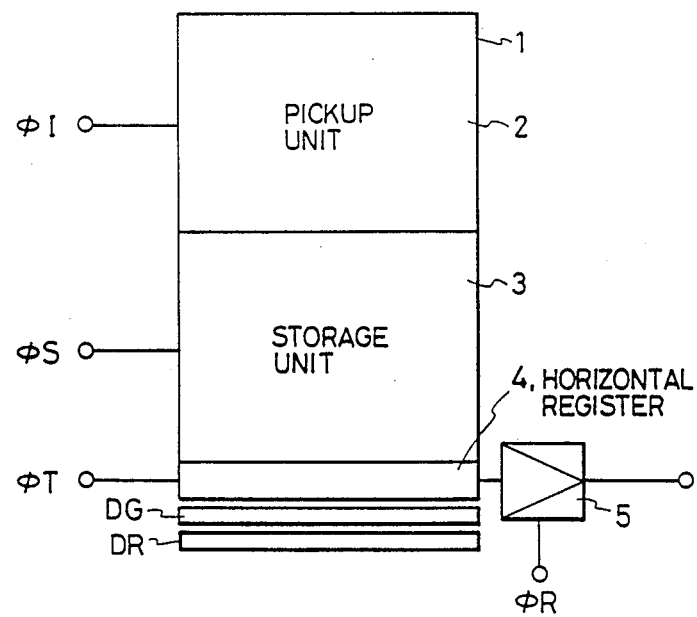
FIG. 1 is an explanatory diagram of a frame transfer type CCD.

FIG. 1 is an arrangement diagram of a CCD solid state image pickup device of the frame transfer type which can be applied to the present invention. In the diagram, reference numeral 1 denotes a frame transfer type CCD solid state image pickup device; 2 is a pickup unit serving as a photosensing part for photoelectrically converting an incident light from an image pickup unit 2 and further reading them out at every horizontal interval; 4 a horizontal register for horizontally transferring, in response to a pulse $\phi T$, the charges which are transferred from the storage unit 3 at every horizontal interval; 5 a charge-voltage converting unit for converting the charges from the horizontal register 4 into a voltage and outputting this voltage; DG a gage or barrier provided along the register 4; and DR an overflow drain.

Figure 2A:
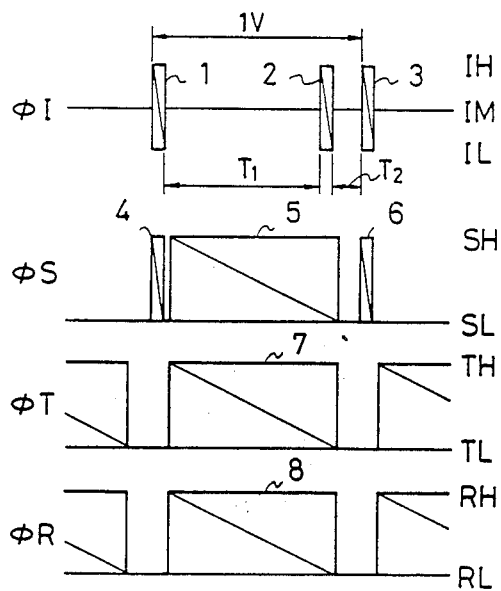
FIG. 2A is an explanatory diagram of the short time mode.

FIG. 2A is a drive waveform diagram in a short time mode of the image pickup device 1. In this diagram $\phi I$, $\phi S$, $\phi T$ and $\phi R$ indicate drive waveforms of the pickup unit 2, storage unit 3, register 4, and converting unit 5, respectively.

Reference numeral IV represents a vertical interval of a television signal and $T_2$ is a substantial accumulating time.

At the start of the vertically transferred to the storage unit 3 in response to vertical transfer pulses indicated at (1) and (4). Thereafter, those charges are transferred to the horizontal register 4 on a line by line basis for one horizontal interval by a pulse shown at (5) and then horizontally transferred by the converting unit 5 for the horizontal interval by a pulse (7). Those charges are converted to a voltage by a pulse (8) and taken out as an output.

Figure 2B:
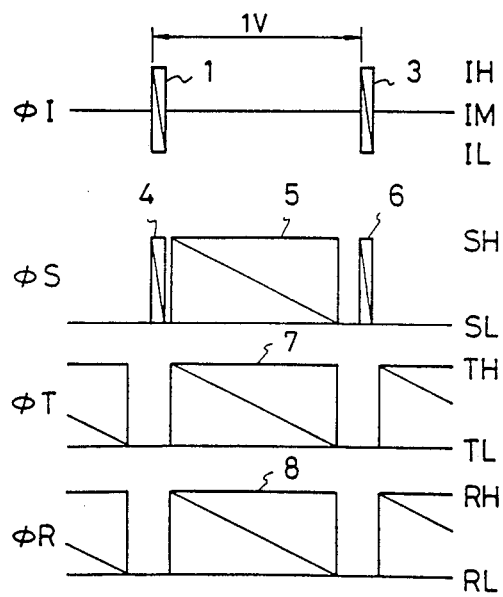
FIG. 2B is an explanatory diagram of the normal mode.

After the charges have been photoelectrically converted and accumulated for a period of time $T_1$ in the pickup unit 2, the charges only in the pickup unit are vertically transferred by a pulse (2) and the charges accumulated for the period $T_1$ are drained from the pickup unit. Thereafter, the charges picked up and accumulated for the period $T_2$ are vertically transferred to the storage unit 3 by pulses (3) and (6). The subsequent operation is executed in a manner similar to the above. As shown in FIG. 2B, the pulse (2) in FIG. 2 is omitted in the normal mode in that about one field period is ordinarily the accumulating time. In the short time mode, the charges only in the pickup unit 2 are certainly transferred by the pulse (2) and when the charges accumulated in the period $T_1$ are drained, the amount of charges which are accumulated for the period $T_1$ is larger than that for the period $T_2$, so that all of them are not always drained by some are left.

Figure 3:
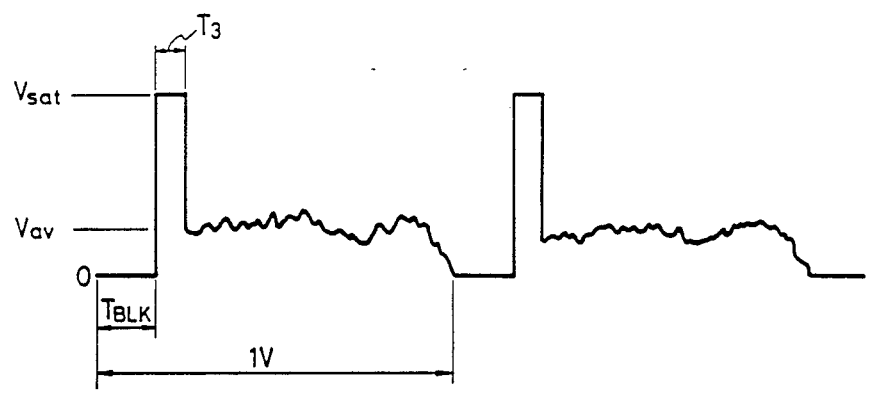
FIG. 3 is an explanatory diagram of an unnecessary signal which is generated in the short time mode.

FIG. 3 shows an output waveform of the image derived as described above.

In FIG. 3, $V_{sat}$ denotes a saturation output voltage of the image pickup device, $V_{av}$ is a normal average output voltage of the image pickup device, and $T_{BLK}$ is a vertical blanking interval. As mentioned above, the residual charges which could not be drained by the vertical transfer before the substantial accumulating time $T_2$ are outputted, so that an output of the $V_{sat}$ level is generated in an initial period $T_3$ of the vertical interval. Which the period $T_3$ is short, this output does not appear on the display screen; however, $V_{sat}$ level is generated in an initial period $T_3$ of the vertical interval. When the period $T_3$ is short, this output does not appear on the display screen; however, $V_{sat}$ is as much as about three to five times larger than $V_{av}$, so that the signal process, iris control, gain control, and the like are largely adversely influenced.

Practically speaking, in general, the iris control, gain control, or the like is carried to in a manner such that an image output, shown in FIG. 3, is transmitted throughout a low-pass filter and its mean value is obtained. When this mean value is small, the iris is largely opened, in execution of the iris control or the gain is increased in executed of the gain control, or the like. Therefore, in the case of performing iris control or gain control, the mean value becomes higher than the inherent level due to the $V_{sat}$ as shown in FIG. 3. Thus, hitherto, there has been a problem that the iris is likely to be closed or the gain to be controlled decreases due to such a variation of the mean value.

Figure 4:
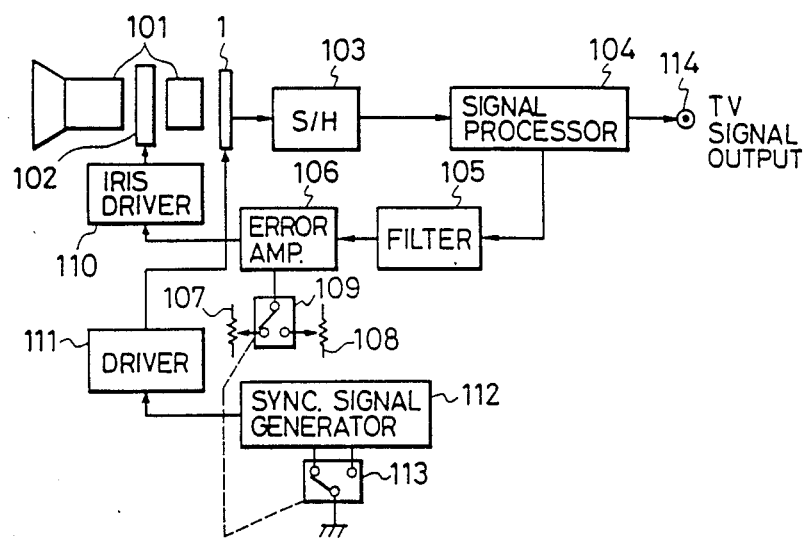
FIG. 4 is a block diagram showing an arrangement of a first embodiment of an image pickup apparatus of the present invention.

FIG. 4 shows the first preferred embodiment of the present invention to solve such a problem. Reference numeral 101 denotes an image pickup optical system including an image pickup lens, an optical filter, and the like; 102 an iris; 103 a sample/hold circuit ("S/H") for sequencing a dispersive output from the image pickup device 1; 104 a signal processor for processing an output signal of the sample/hold circuit 103 and synthesizing a television signal; 105 a filer circuit for filtering a luminance signal which is outputted from the processor 104;

106 and error an error or differential amplifier for comparing an output of the filter circuit 105 with a reference level; 107 and 108 voltage dividers for generating reference levels; 109 a switch serving as correcting means for switching between the reference levels formed by the dividers 107 and 108; 110 an iris driver serving as control means for controlling an amount of photo charges produced in the image pickup device 1 by driving the iris; 111 a driver for driving the device 1; 112 a sync signal generator serving as accumulating time control means for generating a drive pulse of the device 1, pulse of the sample/hold circuit 103, a sync signal, and the like as shown in FIGS. 2A and 2B; and 113 a switch for switching the operating mode of the generator 112 and thereby switching the operating mode of the device 1. The switches 10-9 and 113 operate in an interlocking manner. The operating modes of the image pickup device 1 include the normal mode, similar to that of ordinary video cameras, in which the accumulating time is used as a vertical interval of a television signal, and the short time mode, in which the charges only in the pickup unit are vertically transferred within the vertical interval. Those operating modes are switched by changing over the outputs of the sync signal generator 112 by the switch 113. An object image is transmitted through the image pickup optical system 101 and iris 102 and photoelectrically converted to an electrical signal by the device 1. This electrical signal is outputted synchronously with the sync signal and sequenced by the sample/hold circuit 103 and processed by the signal processor 104. At the same time, a television signal is synthesized together with the sync signal from the generator 112 and outputted to a television signal output terminal 114. On the other hand, a luminance signal for the iris control is outputted from the signal processor 104, filtered by the filter 105 and compared with the reference level by the error or differential amplifier 106. Them, the luminance signal is inputted to the iris driver 110, thereby controlling the iris 102.

Due to this control, the feedback control is performed in a manner such that a mean value of the output voltage of the filter 105, namely the output voltage of the device 1, becomes a constant voltage which is set by the voltage driver 107 or 108.

In this embodiment, two kinds of reference voltages are provided for the error or differential amplifier 106 and switched by the switch 109, which operates interlockingly with the switch 113 as mentioned above. namely, the reference voltages are set in with the accordance with the normal and short time modes as the operating modes of the image pickup device. Image pickup means is constituted by the components, 1, 101, to 108, 110 to 114 and the like.

In the case of performing the operation in the short time mode in accordance with the timing as shown in FIG. 2A, the output of the divider 108 in the short time mode is set to a voltage higher than that of the output of the voltage divider 107 in the normal mode by only about an amount of product of the time period $T_3$ and $V_{sat}$ in FIG. 3. Due to this, which is obtained as the output as the output of the image pickup device 1, the luminance f the object image on the display screen be kept constant irrespective of the operating mode of the device 1.

Although the reference levels can be switched by the switch 109 in this embodiment the substantial accumulating time may be varied sequentially or in a stepwise manner and further the reference voltage may be changed subsequently or in a stepwise manner in response to the variation of the accumulating time.

The invention also incorporates the above-mentioned constitution. On one hand, the invention can be also applied even to the constitution such that the level of the video signal of the image pickup means is controlled by a shutter in place of the iris.

In this case, the shutter may include not only mechanical or physical shutters but also electronic shutters, namely, means for controlling the accumulating time.

The invention can be also useful or the constitution such that the amount of photocharges which are produced is controlled using a combination of two or three of the iris, shutter, and means for controlling the video signal level.

The apparatus may be also constituted in a manner such as to prevent the output of the image pickup device in the period $T_3$ in FIG. 3 from being inputted to the input side of the signal professor 104 by way of the method whereby the operation of the sample/hold circuit 103 is stopped for the period $T_3$ in FIG. 3, or a gate circuit is interposed in the signal system and the operation of the S/H circuit 103 is interrupted for the period $T_3$, or the like. Even in this case as well the invention can be embodied in a manner similar to the above. However in this case, since the video signal becomes a black level for the period $T_3$, the reference level is needed to be reduced in the short time mode.

Although the charges only in the pickup unit are vertically transferred within the vertical interval in the short time mode of the image pickup device in the above embodiment, the invention can be also applied to the system in which the charges in both of the pickup unit and the storage unit are drained within the vertical interval. In this case, the reference voltage in the sort time mode is set to be lower than threat in the normal mode.

Figure 5:
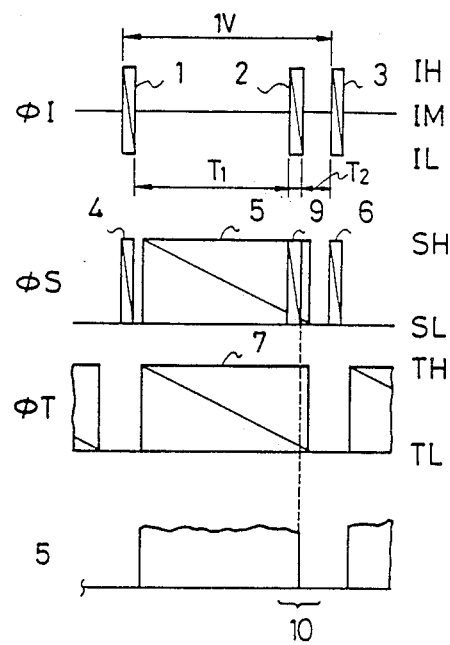
FIG. 5 is a timing chart of a second embodiment of the invention.

FIG. 5 is a diagram showing the second embodiment of the invention in the case as mentioned above, namely, showing a modification in the short time mode. In this embodiment, the charges in the storage unit are also vertically transferred at a high-speed vertical transfer of the charges in the pickup and storage units are collected to the horizontal shift register 4 and overflow. These overflow charges flow into the drain DR through the gate or barrier DG and are drained.

Thus, the output of the cage-voltage converting unit 5 lacks when the overflow of charges occurs in the shift register 4 as shown by the portion 10 in FIG. 5. In this case, as mentioned above, the reference voltage in the short time mode is corrected so as to become a value lower than that in the normal mode by correcting means by way of a switch or the like.

In addition, among image pickup devices of other systems, for example, CCD or MOD image pickup devices of the interline system, or the like, various kinds of devices capable of controlling he accumulating time have been also considered. The invention can be also applied to the case where the output characteristics of the image pickup devices in the sort time mode and normal mode differ.

Although the foregoing embodiments have been described with respect to the case where the invention was applied to the iris control system, the invention was applied to the iris control system, the invention can be also applied to the gain control system which operates such as to make the output level constant by changing the gain in accordance with the voltage of the video signal.

That is, invention also includes the constitution in which the video signal level is controlled by the output system of the image pickup device.

Figure 6:
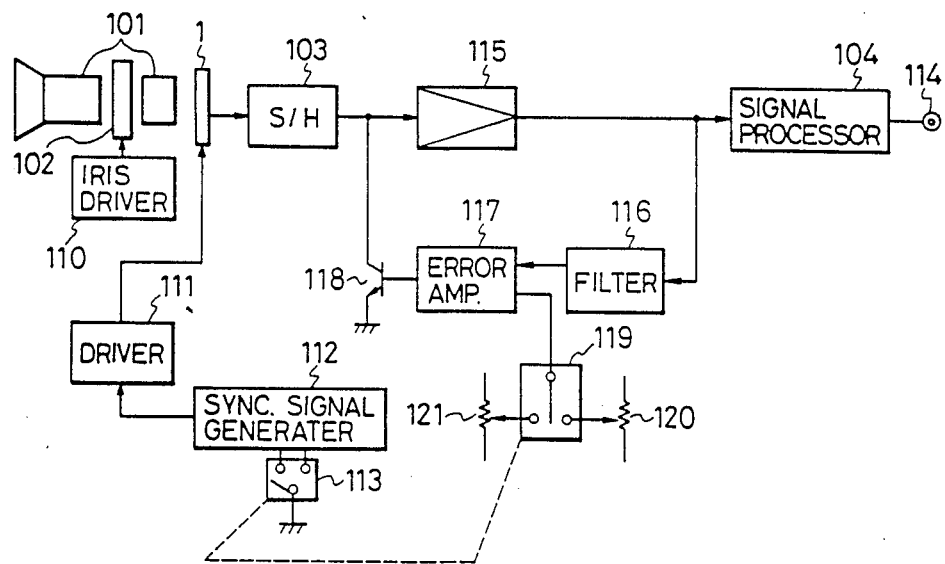
FIG. 6 is a block diagram showing an arrangement of a third embodiment of the invention.

FIG. 6 is a diagram showing the third embodiment of the inventions in the above-mentioned case, in which the same parts and components as those shown in FIG. 4 are designated by the same reference numerals.

Reference numeral 115 denotes an amplifier; 116 a filter circuit for filtering an output of the amplifier 115; 117 an error or differential amplifier for comparing an output of the filter 116 with reference level and thereby forming an error or difference signal; and 118 a transistor an impedance of which varies in response to an output of the amplifier 117. The video input level to the amplifier 115 is changed by the transistor 118, thereby controlling the gain.

Voltage dividers 120 and 121 generate reference voltages, respectively, and either one of them is inputted as a reference level to the error or differential amplifier 117. The output level of the divider 120 is higher than the output level of the divider 121.

A switch 119 serves as correcting means of switching those references levels and is switched interlockingly with the change-over of the switch 113 to switch the operating modes of the image pickup device.

Namely, the switch 119 is switched such as to input the output of the voltage divider 120 to the error amplifier 117 when the switch 113 is switched to the side of the short time mode and to input the output of the voltage divider 121 to the error amplifier 117 when the switch 113 is switched to the side of the normal mode.

As another example of the constitution in which the video signal level of the image pickup means is controlled due to the gain control as mentioned above, it is also possible to control the video signal level of the image pickup means by controlling the sensitivity of the image pickup device itself.

According to those methods by the gain control, there is an effect such that the response speed is very high as compared with the method whereby the video signal level is changed using the iris, shutter, or the like.

The occurrence of the malfunction in the control of the iris and gain control systems due to the signal which is generated for the period $T_3$ in FIG. 3 can be solved by the foregoing embodiments. However, there is a problem such that when the signal showing FIG. 3 is reproduced by the monitor display, the signal which is generated for the period $T_3$ in FIG. 3 appears in a part of the screen and an indistinct image is displayed as mentioned above. And embodiment to solve such a problem will then be described with reference to FIGS. 7 to 12.

Figure 7:
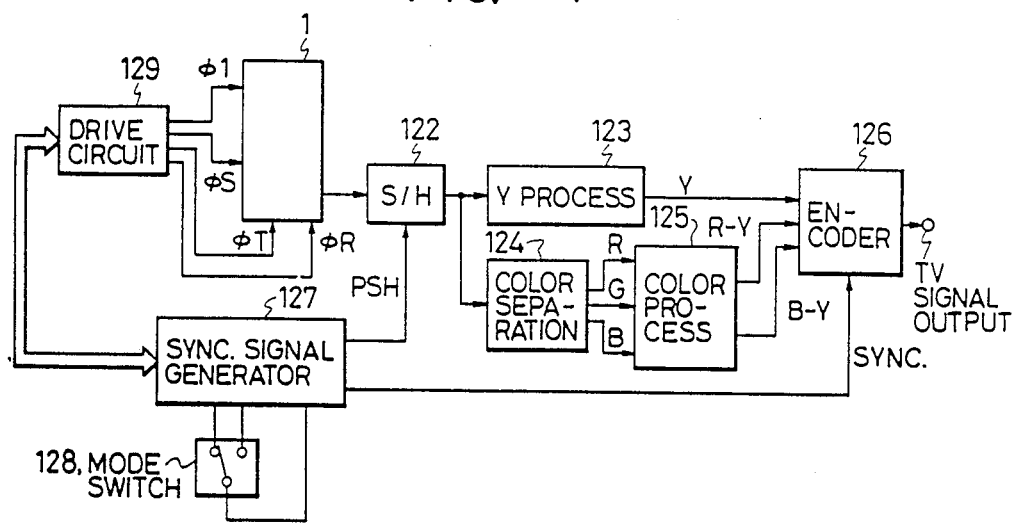
FIG. 7 is a block diagram showing an arrangement of the third embodiment of the of an image pickup apparatus of the invention.

FIG. 7 shows an embodiment to solve the above-mentioned problem of the invention. In FIG. 7 reference numeral 122 denotes a sample/hold circuit serving as mask means for eliminating a clock signal from the output of the image pickup device 1 and also setting the signal of a predetermined level; 123 a luminance signal y processor including a low-pass filter, clamping circuit, a gamma circuit for separating chrominance signals of red R, blue B, and Green G from an output of the sample/hold circuit 122; 125 a color processor including low-pass filters, clamping circuits, gamma circuits, clipping circuits, and matrix circuits of those R, G and B signals; 126 an encoder for synthesizing a television signal by the Y, R-Y, and B-Y signals and a sync signal; 127 a sync signal generator including a reference oscillation frequency divider and a decoder; 128 a mode switch for switching the operating modes of the generator 127; and 129 a drive circuit for producing a drive pulse of the image pickup device by an output of the generator 127.

The output of the image pickup device 1 is sequenced after removing the clock signal therefrom by the sample/hold circuit 122. the luminance signal Y is formed by the Y processor 123 and inputted to the encoder 126. The output of the S/H circuit 122 is also inputted to the color separating circuit 124. by which the color components in the video signal are separated in accordance with a pattern of a color separating filter (not shown) sticked on the image pickup device 1, thereby forming the R, B and G signals. These R, G and B signals are respectively processed by the color processor 125 and further subjected to the matrix operation to form the color difference signals R-Y and B-Y. The encoder 126 receives the Y signal from the Y processor 123, the R-Y and B-Y signals from the color processor 125, and the sync signal from the generator 127 and forms a television signal of, for example the NTSC system or the like the outputs this TV signal. The mode switch 128 switches the operating modes of the image pickup device 1 to either of the normal mode and the short time mode.

The operation of the drive circuitry 129 shown in FIG. 7 will then be described with reference to timing charts shown in FIGS. 8A to 8D.

Figure 8A:
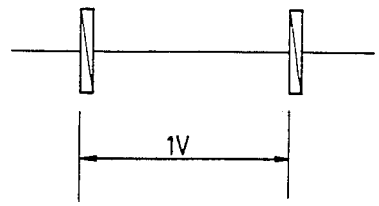
FIGS. 8A to 8D are timing charts of the third embodiment of the invention.
Figure 8B:
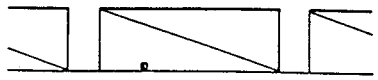
Figure 8C:
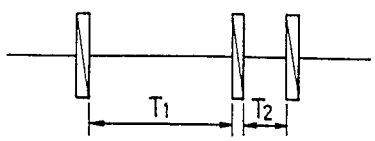
Figure 8D:
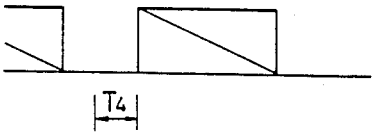

FIG. 8A shows a pulse $\phi I$ in the normal mode and the vertical transfer is performed within the vertical blanking interval; i response to this pulse $\phi I$. FIG. 8B shows a pulse $P_{SH}$ in the normal mode which is continuously generated for the video interval. FIG. 8C shows a pulse $\phi I$ in the short time mode and a vertical transfer pulse is generated within the video interval, thereby reducing the substantial accumulating time. FIG. 8D shows a pulse $P_{SH}$ in the short time mode and pulse $P_{SH}$ is stopped for a period of time $T_4$ which is slightly (for example, one to a few horizontal interval) longer than the time corresponding to $T_3$ in FIG. 3 in the video period.

Figure 9:
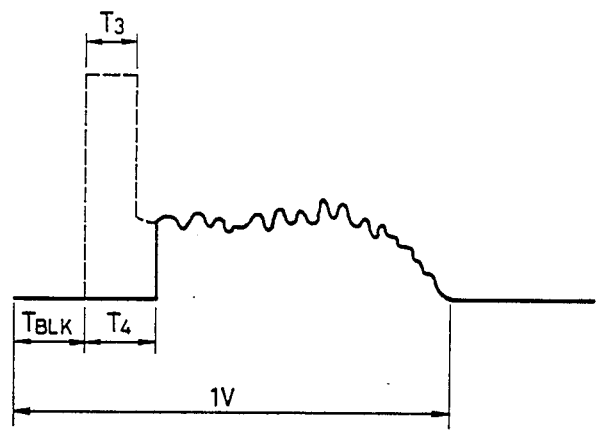
FIG. 9 is an output diagram of a sample/hold circuit of the third embodiment of the invention.

The output of the sample/hold circuit 127 in the short time mode is shown n FIG. 9. It will be appreciated that there is an effect such that the signal due to the charges which cannot be drained for the period $T_3$ does not appear in the output of the S/H circuit 127, so that the following circuits are not adversely affected. Further, in this case even when the video signal is displayed on the monitor screen as well, the display portion corresponding to the period $T_3$ is muted and becomes black; therefore, the foregoing problem such that an indistinct image is displayed on the monitor screen is solved.

Figure 10:
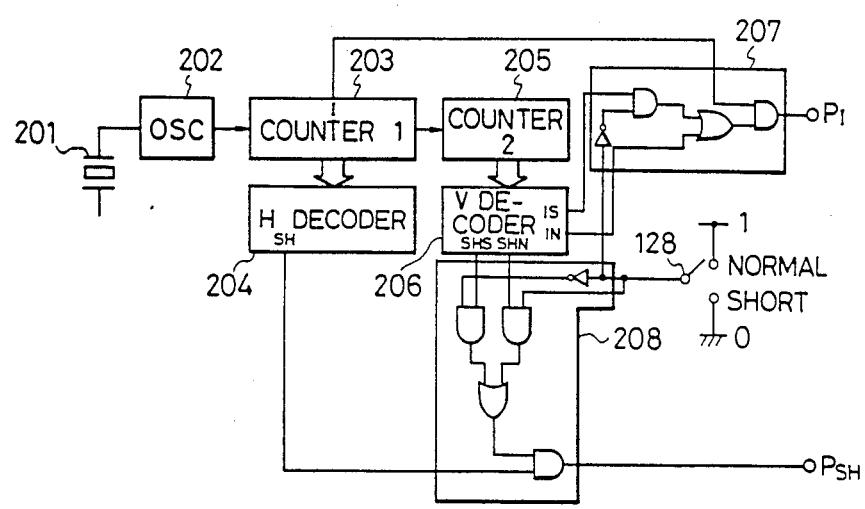
FIG. 10 is a diagram showing an example of an arrangement of a sync signal generator 127 shown in FIG. 7.

FIG. 10 is a block diagram showing an arrangement f the main part of the sync signal generator 127. In FIG. 10, reference numeral 201 denotes a quartz resonator; 202 a reference oscillator; 203 a counter-1; 204 a decoder of a pulse of the H system; 205 a counter-2; 206 a decoder of a pulse of the V system; 207 a $P_I$ switching circuit; and 208 a $P_{SH}$ switching circuit. When an output of the mode switch 128 is "1", the pulses $P_I$ and $P_{SH}$ as shown in FIGS. 8A and 8B are formed from pulses $I_H$ and $S_{HN}$ in the normal mode. When the output of the mode switch 128 is "0", the pulses $P_I$ and $P_{SH}$ as shown in FIGS. 8C and 8D are formed from pulses $I_s$ and $S_{HS}$ in the short time mode.

Figure 11:
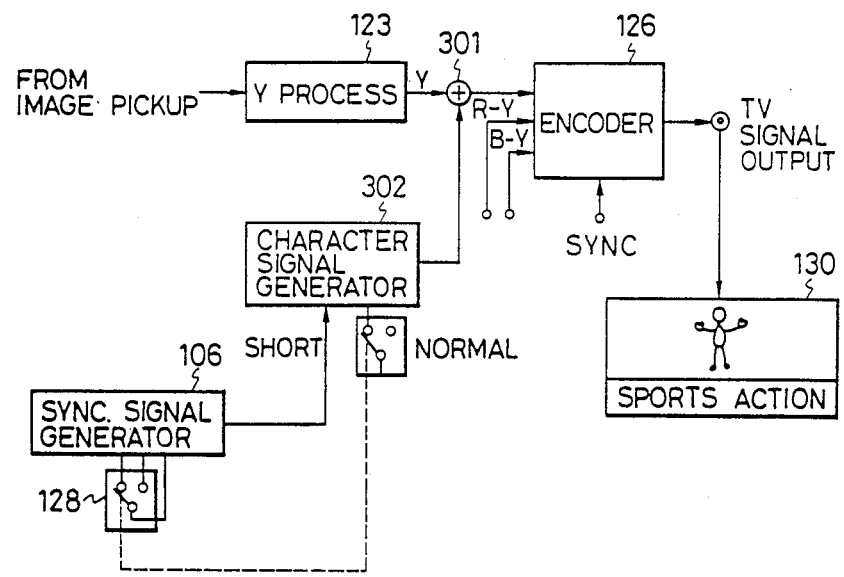
FIG. 11 is a block diagram of an embodiment in which a signal which is generated for the interval shown at $T_3$ in FIG. 3 is replaced by another signal.

With reference to FIG. 11, explanation will then be made with regard to an embodiment in which the signal which is generated for the period $T_3$ in FIG. 3 replaced by, for example, a character pattern signal to solve the problem such that the signal which is generated for the period $T_3$ in FIG. 3 appears on a part of the display screen and causes the display image to become indistinct.

FIG. 11 is a block diagram showing an embodiment in such a case.

In FIG. 11, reference numeral 301 denotes an adder and 302 is a character signal generator. When the mode switch 128 is switched to the side of the normal mode, a character signal generator 302 does not operate. On the contrary, when the witch 128 is switched to the side of the short time mode, the generator 302 operates a character signal is generated and the character data is mixed to the luminance signal by the adder 301. The character signal is constituted such as to insert characters for the period $T_4$ in FIG. 9 in response to the sync pulse from the sync signal generator 106. The signal which is generated is not limited to the character signal but may be a symbol signal or the like.

In FIG. 11, reference numeral 130 denotes an example of display on the monitor when characters were inserted such a case. According to this embodiment, when the substantial accumulating time is shorter than the ordinary time, the situation in which the photographing operation suitable for "SPORTS ACTION" using a short accumulating time is being executed can be displayed on the monitor and informed to the operator who is watching the monitor 130.

According to this embodiment, even when the substantial accumulating time of the image pickup device is set to be short, it is possible to eliminate an adverse influence to the display screen due to the unnecessary charges when the video signal is displayed on the monitor.

Although the above embodiment relates to the system in which the charges only in the pickup unit are vertically transferred within the vertical interval in the short time mode of the image pickup device, even in the system in which the charges in both the pickup and storage units are drained within the vertical interval as well, a part of the readout image becomes indistinct; therefore, the invention can be applied to such a system.

Figure 12:
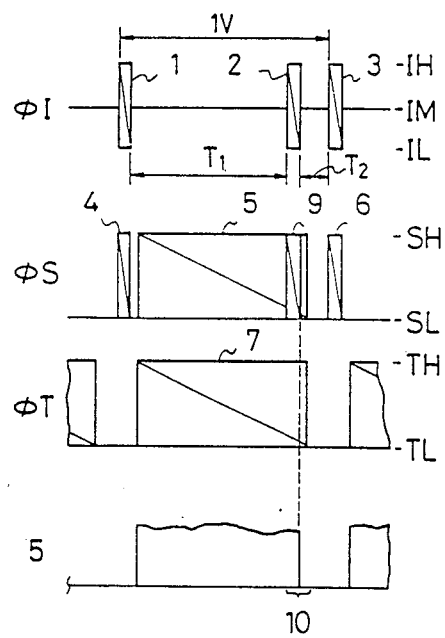
FIG. 12 is a timing chart of another embodiment of the short time mode shown in FIG. 2A

FIG. 12-shows as timing chart of an embodiment in the case where the invention is applied to the system for performing the vertical transfer as mentioned above; namely, a modified form of the short time mode is shown. In this embodiment, the charges in the storage unit are also vertically transferred at a high speed in the portion (9) synchronously with the high-speed vertical transfer in the portion (2) in the pickup unit. Therefore, the charges in the pickup and storage units are collected to the horizontal shift register 4 and overflow. These overflow charges flow into the drain DR through the gate or barrier DG and are drained.

Thus, the output of the charge-voltage converting unit 5 lacks in the portion (10) and an indistinct image is damage on the screen.

To solve this drawback, the methods shown in the embodiments of FIGS. 7 to 12 can be applied.

On one hand, among image pickup devices of other systems, for example, CCD or MOS image pickup devices of the interline system, or the like, various kinds of devices capable of controlling the accumulating time have been considered. For instance, in the case of controlling the accumulating time using the interline system CCD, a noise component is added to the screen at near the end of the vertical interval. Therefore, it is sufficient to control the video signal level in this portion so at to become a predetermined level.

Although the substantial accumulating time $T_2$ is constant in the above embodiment, it may be variable continuously or in a multistepwise manner. In such a case, the amount of charges which cannot be drained depends on the period $T_2$. For instance, since the amount of charges which cannot be drained increases as the period $T_2$ becomes short, the apparatus may be constituted such as to change the period $T_4$ shown in FIGS. 8 and 9 in accordance with the duration of the period $T_2$.

In addition, although the constitution to stop the operation of the sample/hold circuit and the gate is closed for the period $T_4$. The invention also includes the constitution in which the signal for a partial interval of the video signal is replaced by anther signal pattern of a predetermined level by a switching circuit.

As described above, according to the embodiments, even then the substitutional accumulating time of the image pickup device is set to be short, an influence to the display screen due to the unnecessary charges can be eliminated.

What is claimed is:

1. An image pickup apparatus comprising:
    (a) image pickup means for converting an image into an electrical signal and for accumulating the electrical signal;
    (b) means for shortening an accumulating time of said image pickup means by supplying thereto an accumulating time control signal;
    (c) means for visually displaying said electrical signal as an image; and
    (d) means for changing a plurality of edge lines of a frame of the electrical signal displayed by said displaying means to a predetermined signal other than the electrical signal in response to the shortening operation of said shortening means, to eliminate noise in said edge lines caused by the shortening operation.

2. An image pickup apparatus according to claim 1, wherein said changing means comprises means for changing a part of said electrical signal to a signal indicative of a character pattern.

3. An image pickup apparatus according to claim 1, wherein said shortening means takes the accumulating time to accumulate a new electrical signal after said shortening means clears an electrical signal of said image pickup means, and then reads out the accumulated signal.

4. An image pickup apparatus according to claim 1, wherein said changing means includes means for mixing a predetermined signal in a part of the electrical signal displayed by said displaying means.

5. An image pickup apparatus according to claim 4, wherein said predetermined signal includes a character pattern.

6. An image pickup apparatus according to claim 1, further comprising:
    (e) means for controlling an amount of electrical signal generated in said image pickup means, according to a level of said electrical signal of said image pickup means.

7. An image pickup apparatus according to claim 6, wherein said controlling means controls an exposure of said image pickup means.

8. An image pickup apparatus according to claim 7, wherein said controlling means changes an exposure condition of said image pickup means according to the shortening operation of said shortening means.

9. An image pickup apparatus comprising:
   (a) image pickup means for providing an image signal representing a received image, said pickup means having at least an image sensing portion for producing the image signal and a readout portion for reading out the image signal;
   (b) drive means for driving said pickup means, said drive means having a first mode for periodically reading out the image signal from the pickup means in a predetermined interval and a second mode for selectively clearing said image signal from said sensing portion of said pickup means during said interval;
   (c) means for visually displaying an image corresponding to the image signal read out by said read out portion of said image pickup means; and
   (d) means for controlling said displaying means to display the operation of said drive means in said second mode.

10. An image pickup apparatus according to claim 9, wherein said pickup means comprises a solid state image sensing device.

11. An image pickup according to claim 9, further comprising manually operable means for selecting between said first mode and said second mode.

12. An image pickup apparatus according to claim 9, wherein said controlling means causes said displaying means to display a special pattern according to said second mode operation of said drive means.

13. An image pickup apparatus according to claim 12, wherein said controlling means includes:
   (a) means for generating a pattern signal to display said special pattern on said displaying means; and
   (b) means for mixing the image signal and the pattern signal, said mixing means supplying mixed signals to said displaying means.

14. An image pickup apparatus according to claim 13, wherein the pattern signal is a signal representative of a character.

15. An image pickup apparatus according to claim 9, wherein said image pickup means further comprises an overflow drain.

16. An image pickup apparatus according to claim 15, wherein said drive means drains an image signal to said overflow drain in said second mode.

17. An image pickup apparatus according to claim 9, further comprising means for variably controlling in said second mode a timing of a read out interval of said first mode during which the image signal is cleared.

18. An image pickup apparatus according to claim 9, further comprising means for controlling an amount of an image signal generated in said image pickup means, according to a level of an image signal read out from said image pickup means.

19. An image pickup apparatus according to claim 9, wherein said amount controlling means controls an exposure of said image pickup means.

20. An image pickup apparatus according to claim 19, wherein said amount controlling means changes the exposure of said image pickup means in accordance with the second mode operation.

* * * * *

UNITED STATES PATENT AND TRADEMARK OFFICE
CERTIFICATE OF CORRECTION

PATENT NO. : 4,963,982          Page 1 of 10
DATED : October 16, 1990
INVENTOR(S) : Teruo Hieda It is certified that error appears in the above-identified patent and that said Letters Patent is hereby corrected as shown below:

ON THE TITLE PAGE,
ITEM [57] ABSTRACT:

Line 11, change "changed" to --changed,--.

IN THE DRAWINGS,
FIG. 6 (Sheet 4):

Box 112, "GENERATER" should read --GENERATOR--.

COLUMN 1:

Line 13, "pickup for" should read

--pickup device.

Description of the Prior Art

In the case of using a solid state image pickup device, for--.

Line 14, "CCD (charge couple device)," should read --CCD (charge-coupled device),--.

Line 15, "era" should read --era,--.

Line 30, "method" should read --method,--.

Line 31, "system" should read --system,--.

Line 32, "to 1/500" should read --to 1/120 second, 1/500--.

UNITED STATES PATENT AND TRADEMARK OFFICE
CERTIFICATE OF CORRECTION

PATENT NO. : 4,963,982          Page 2 of 10

DATED : October 16, 1990

INVENTOR(S) : Teruo Hieda

It is certified that error appears in the above-identified patent and that said Letters Patent is hereby corrected as shown below:

COLUMN 1 (cont'd.):

Line 44, "time $T_2$" should read
--time $(t_1)$ is set to 1/500 second, the ratio of the accumulating time $t_2$--, and
"to" (third occurrence) should be deleted.

Line 46, "$t_2/t_1=(1/60-1/500)\ 1/500\div 7.3$" should read
--$t_2/t_1=(1/60-1/500)\ 1/500\approx 7.3$--.

Line 49, "about 7.3" should read --about 7.3.--.

Line 50, "a period" should read --the period--.

Line 60, "charges" should read --charges,--.

COLUMN 2:

Line 16, "even" should read --even in--.

Line 18, "reduced to" should read --reduced due to--.

Line 51, "puted" should read --putted--.

Line 57, "embodiment" should read --embodiment,--.

Line 62, "mans" should read --means--.

Line 67, "t" should be deleted.

UNITED STATES PATENT AND TRADEMARK OFFICE
CERTIFICATE OF CORRECTION

PATENT NO. : 4,963,982
DATED : October 16, 1990
INVENTOR(S) : Teruo Hieda

It is certified that error appears in the above-identified patent and that said Letters Patent is hereby corrected as shown below:

COLUMN 3:

Line 1, "the" (second occurrence) should be deleted.

Line 25, "the of" should be deleted.

Line 52, "pickup unit" should read
--pickup optical system (not shown) and accumulating charges; 3 a storage unit for transferring the charges in the pickup unit--.

COLUMN 4:

Line 1, "the vertically" should read --the vertical interval, the charges in the pickup unit 2 are vertically--.

Line 6, "by" should read --to--.

Line 19, "FIG. 2" should read --FIG. 2A--.

Line 22, "certainly" should read --vertically--.

Line 38, "Which" should read --When--.

Line 39, "level is gener-" should be deleted.

Lines 40 and 41, lines 40 and 41 should be deleted.

Line 42, "display screen; however, $V_{sat}$" should be deleted.

UNITED STATES PATENT AND TRADEMARK OFFICE
CERTIFICATE OF CORRECTION

PATENT NO. : 4,963,982

DATED : October 16, 1990

INVENTOR(S) : Teruo Hieda

It is certified that error appears in the above-identified patent and that said Letters Patent is hereby corrected as shown below:

COLUMN 4 (cont'd.):

Line 48, "through-" should read --through--.

Line 49, "out" should be deleted.

Line 67, "filer circuit" should read --filter circuit--.

COLUMN 5:

Line 1, "and error" should be deleted.

Line 12, "1, pulse" should read --1, a drive pulse--, and "sync signal," should read --sync pulse for signal processing, a television sync signal,--.

Line 14, "operating mode" should read --operating modes--.

Line 16, "switches 10-9 and 113" should read --switches 109 and 113--.

Line 25, "switch 113. An" should read --switch 113.
        An--.

Line 49, "namely," should read --Namely,--, and "with the" should be deleted.

Line 52, "101," should read --101--.

Line 56, "divider 108" should read --voltage divider 108--.

UNITED STATES PATENT AND TRADEMARK OFFICE
CERTIFICATE OF CORRECTION

PATENT NO. : 4,963,982   Page 5 of 10
DATED : October 16, 1990
INVENTOR(S) : Teruo Hieda It is certified that error appears in the above-identified patent and that said Letters Patent is hereby corrected as shown below:

COLUMN 5 (cont'd.):

Line 60, "this, which" should read --this, it has been confirmed that in the television signal which--.

Line 61, "as the output" should be deleted.

Line 62, "f" should read --of--, and "be" should read --can be--.

Line 66, "embodiment" should read --embodiment,--.

COLUMN 6:

Line 1, "subsequently" should read --sequentially--.

Line 11, "or" should read --for--.

Line 14, "the video" should read --the accumulating time in accordance with the video signal level and thereby controlling the video--.

Line 19, "signal professor 104" should read --signal processor 104,--.

Line 24, "well" should read --well,--.

Line 26, "ever" should read --ever,--.

Line 35, "sort" should read --short--.

Line 36, "threat" should read --that--.

UNITED STATES PATENT AND TRADEMARK OFFICE
CERTIFICATE OF CORRECTION

PATENT NO. : 4,963,982
DATED : October 16, 1990
INVENTOR(S) : Teruo Hieda

It is certified that error appears in the above-identified patent and that said Letters Patent is hereby corrected as shown below:

COLUMN 6 (cont'd.):

Line 42, "a high-speed" should read --a high speed as indicated at (9) synchronously with the high-speed--.

Line 43, "pickup and" should read --pickup unit as indicated at (2). Therefore, the charges in the pickup and--.

Line 48, "cage-voltage" should read --charge-voltage--.

Line 50, "portion 10" should read --portion (10)--.

Line 58, "he" should read --the--.

Line 61, "sort" should read --short--.

Line 65, "was" (second occurrence) should be deleted.

Line 66, "applied to the iris control system, the invention" should be deleted.

COLUMN 7:

Line 3, "invention" should read --the invention--.

Line 7, "inventions" should read --invention--.

Line 13, "reference level" should read --a reference level--.

UNITED STATES PATENT AND TRADEMARK OFFICE
CERTIFICATE OF CORRECTION

PATENT NO. : 4,963,982

DATED : October 16, 1990

INVENTOR(S) : Teruo Hieda

It is certified that error appears in the above-identified patent and that said Letters Patent is hereby corrected as shown below:

COLUMN 7 (cont'd.):

Line 24, "means of" should read --means for--.

Line 48, "showing" should read --shown in--.

Line 52, "And" should read --An--.

Line 53, "then" should read --now--.

Line 59, "signal of" should read --signal for a partial period of the video signal to the signal of--.

Line 60, "y processor" should read --Y processor--.

Line 61, "circuit for" should read --circuit, and a clipping circuit; 124 a color separating circuit for--.

Line 62, "Green G" should read --green G--.

COLUMN 8:

Line 8, "the" should read --The--.

Line 22, "example" should read --example,--.

Line 27, "drive circuitry 129" should read --drive circuit 129--.

Line 28, "then" should read --Now--.

UNITED STATES PATENT AND TRADEMARK OFFICE
CERTIFICATE OF CORRECTION

PATENT NO. : 4,963,982      Page 8 of 10
DATED : October 16, 1990
INVENTOR(S) : Teruo Hieda It is certified that error appears in the above-identified patent and that said Letters Patent is hereby corrected as shown below:

COLUMN 8 (cont'd.):

Line 32, "interval; i" should read --interval in--.

Line 44, "n" should read --in--.

Line 49, "case" should read --case,--.

Line 55, "f" should read --of--.

Line 62, "pulses $I_H$" should read --pulses $I_N$--.

Line 63, "$S_{HN}$" should read --$SH_N$--.

Line 65, "$S_{HS}$" should read --$SH_S$--.

Line 67, "then" should read --now--.

COLUMN 9:

Line 13, "witch 128" should read --switch 128--.

Line 14, "operates a" should read --operates and a--.

Line 24, "inserted such" should read --inserted in such--.

Line 59, "damage" should read --displayed--.

UNITED STATES PATENT AND TRADEMARK OFFICE
CERTIFICATE OF CORRECTION

PATENT NO. : 4,963,982

DATED : October 16, 1990

INVENTOR(S) : Teruo Hieda

It is certified that error appears in the above-identified patent and that said Letters Patent is hereby corrected as shown below:

COLUMN 10:

Line 2, "at" should read --as--.

Line 15, "circuit and" should read --circuit was used as the mask means in the foregoing embodiments, the apparatus may be constituted such that a gate circuit is provided in front of or after the sample/hold circuit and--.

Line 18, "anther" should read --another--.

Line 21, "then" should read --when--, and "substitutional" should read --substantial--.

COLUMN 11:

Line 19, "read" (second occurrence) should read --read- --.

Line 25, "solid state" should read --solid-state--.

Line 27, "image pickup" should read --image pickup apparatus--.

UNITED STATES PATENT AND TRADEMARK OFFICE
CERTIFICATE OF CORRECTION

PATENT NO. : 4,963,982

DATED : October 16, 1990

INVENTOR(S) : Teruo Hieda

It is certified that error appears in the above-identified patent and that said Letters Patent is hereby corrected as shown below:

<u>COLUMN 12</u>:

Line 19, "read out" should read --readout--.

Signed and Sealed this

Twenty-eighth Day of July, 1992

Attest:

DOUGLAS B. COMER

*Attesting Officer*    Acting Commissioner of Patents and Trademarks